US010664212B2

(12) United States Patent
Suzuki

(10) Patent No.: US 10,664,212 B2
(45) Date of Patent: May 26, 2020

(54) IMAGE FORMING APPARATUS, CONTROL METHOD FOR IMAGE FORMING APPARATUS, AND STORAGE MEDIUM FOR CONTROLLING STORAGE OF A PRINT JOB

(71) Applicant: CANON KABUSHIKI KAISHA, Tokyo (JP)

(72) Inventor: Shintarou Suzuki, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/189,994

(22) Filed: Nov. 13, 2018

(65) Prior Publication Data

US 2019/0146727 A1 May 16, 2019

(30) Foreign Application Priority Data

Nov. 16, 2017 (JP) .................................. 2017-221221

(51) Int. Cl.
*G06F 3/12* (2006.01)

(52) U.S. Cl.
CPC .............. *G06F 3/126* (2013.01); *G06F 3/122* (2013.01); *G06F 3/1204* (2013.01); *G06F 3/1267* (2013.01); *G06F 3/1207* (2013.01); *G06F 3/1274* (2013.01)

(58) Field of Classification Search
CPC ........ G06F 3/126; G06F 3/122; G06F 3/1267; G06F 3/1204; G06F 3/1274; G06F 3/1207; G06F 3/1237; H04N 1/2166; G06K 15/1886
See application file for complete search history.

(56) References Cited

U.S. PATENT DOCUMENTS

2011/0170893 A1* 7/2011 Nishikawa ............. G03G 15/55
399/81
2016/0210094 A1* 7/2016 Nishikawa ............ G06F 3/1267

FOREIGN PATENT DOCUMENTS

JP         2013-191179 A     9/2013

* cited by examiner

*Primary Examiner* — Kent Yip
(74) *Attorney, Agent, or Firm* — Canon U.S.A., Inc. IP Division

(57) ABSTRACT

In a reserved printing, when an MFP receives print jobs, print jobs having their print reservation times within a predetermined time range with reference to the times of receipts are retained within the MFP. On the other hand, print jobs having their print reservation times not within the predetermined time range are not retained within the MFP and are cancelled.

11 Claims, 15 Drawing Sheets

FIG. 7

| USER NAME | INPUT TIME | RESERVATION TIME | IP ADDRESS | FILE PATH | FILE NAME | PRINT SETTINGS |
|---|---|---|---|---|---|---|
| User1 | 2017/05/01, 08:30:00 | 2017/05/02, 8:00:00 | 192.168.1.1 | /printdata/reserver/x | sample01.pdf | ......... |
| User1 | 2017/05/01, 9:00:00 | 2017/05/01, 20:00:00 | 192.168.1.1 | /printdata/reserver/x | test.txt | ......... |
| User2 | 2017/05/01, 19:00:00 | 2017/05/02, 8:30:00 | 192.168.1.1 | /printdata/reserver/y | chart.pptx | ......... |

IMAGE FORMING APPARATUS, CONTROL METHOD FOR IMAGE FORMING APPARATUS, AND STORAGE MEDIUM FOR CONTROLLING STORAGE OF A PRINT JOB

BACKGROUND OF THE INVENTION

Field of the Invention

The present invention relates to an image forming apparatus such as a print management system, a control method therefor and a storage medium.

Description of the Related Art

In the past, an MFP (Multi-function printer) prints out a page image every time a print job is input from a terminal apparatus such as a PC (personal computer). Therefore, for example, in an office environment in which a plurality of users shares one MFP, one user may occupy the MFP by causing the MFP to print out a large number of pages during a working time. Then, the other users cannot use the MFP, possibly causing problems in works. Accordingly, in recent years, reserved printing (Japanese Patent Laid-Open No. 2013-191179) has been proposed which avoids printing a large number of pages during office hours and prompts a user to designate a time zone when no other works are performed, such as midnight, early morning or a break time for executing the printing.

However, no higher limit for time that can be reserved may possibly result in accumulation of a print job designated to be executed at a remote future time in an MFP. Accumulation of such reserved jobs may possibly exhaust the resource of an HDD (Hard Disk Drive). In order to avoid this problem, setting a higher limit for a time that can be reserved by a print application such as a print driver in a PC has been proposed. However, it is difficult to exhaustively implement the avoidance solution in all print applications including print applications developed by third parties.

Furthermore, there may be a difference between an internal time of PC and an internal time of an MFP. The same problem may occur in a case where a print job reserved for a time under a higher limit time in the PC may possibly be a print job designated to be reserved at a remote future time to the MFP.

SUMMARY OF THE INVENTION

According to an aspect of the present disclosure, an image forming apparatus includes a print job storage unit configured to store a transmitted print job, a print reservation time storage unit configured to store a transmitted print reservation time, a print reservation time determination unit configured to determine whether the print reservation time is within a predetermined time range or not, and a print job execution unit configured to execute the print job at the print reservation time. The print job execution unit cancels the print job in a case where the print reservation time determination unit determines that the print reservation time is not within the predetermined time range.

Further features of the present invention will become apparent from the following description of exemplary embodiments with reference to the attached drawings.

BRIEF DESCRIPTION OF THE DRAWINGS

FIG. 7 illustrates a reservation table for managing print jobs relating to reserved printing within the MFP.

DESCRIPTION OF THE EMBODIMENTS

Modes for embodying the present disclosure will be described with reference to drawings.
Configuration of Print Management System

Embodiment 1

Figure 1:
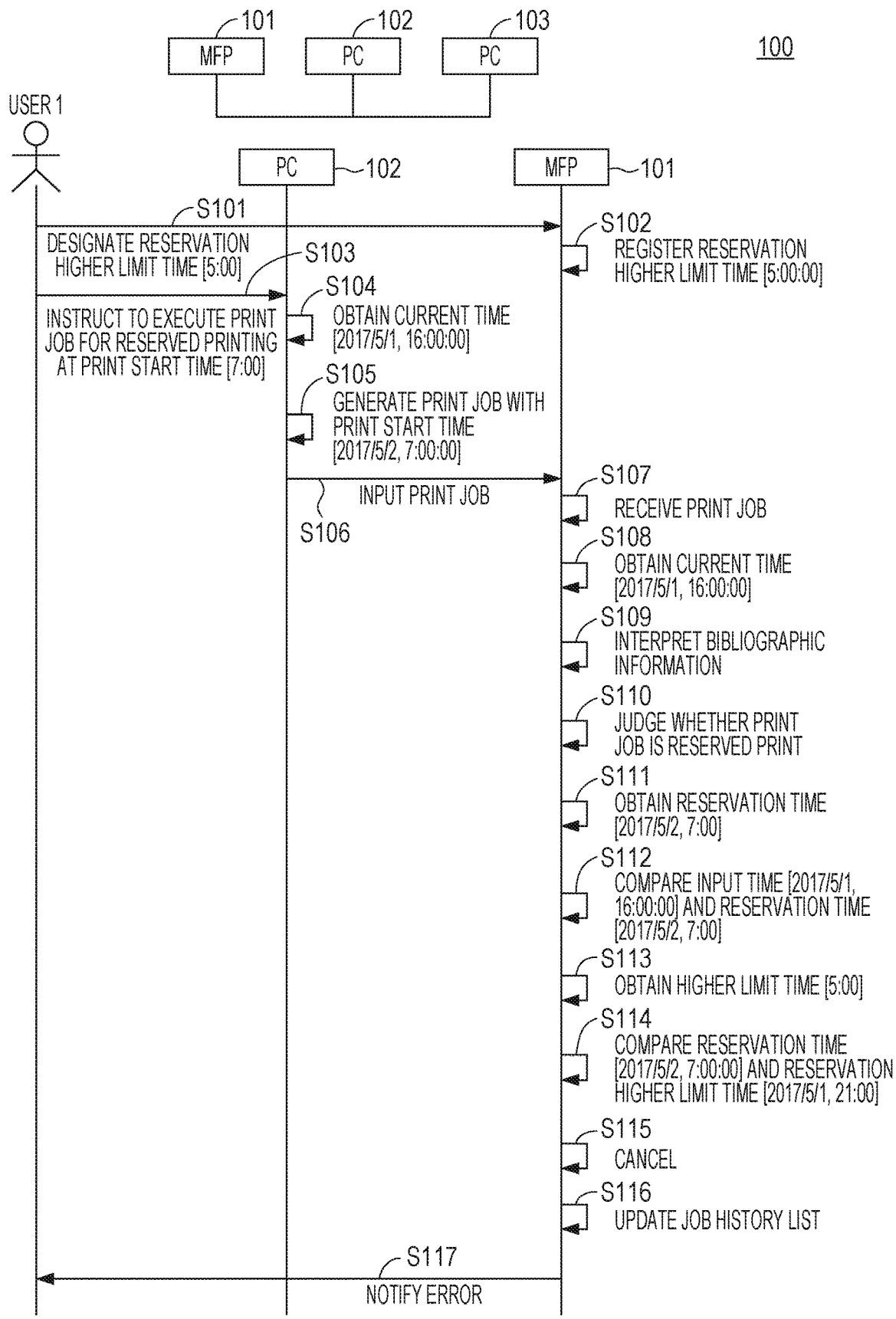
FIG. 1 illustrates a network configuration and a processing sequence according to Embodiment 1.

FIG. 1 illustrates a system configuration applicable to an MFP that is an image forming apparatus according to Embodiment 1 of the present disclosure.

FIG. 1 illustrates a network 100 supporting TCP/IP (Transmission Control Protocol/Internet Protocol), for example. An MFP 101, a PC 102, and a PC 103 are connected to the network 100.

The MFP 101 functions as a print data receiver configured to print out or hold print data for future output when the MFP 101 receives the print data from the PC 102. It should be noted that FIG. 1 illustrates a conceptual, general configuration. A plurality of MFPs may be connected, or an SFP (Single Function Printer) may be connected thereto instead of an MFP.

Next, an example of a processing sequence will be described which is to be performed by a print management system according to the present disclosure by using the MFP 101 and the PC 102.

In S101, User 1 designates [5:00] as a reservation higher limit time at which a reserved printing can be executed to the MFP 101.

In S102, in response to the designation of the reservation higher limit time from User 1, the MFP 101 registers [5:00:00] as the reservation higher limit time.

Next in S103, User 1 instructs a print driver running on the PC 102 to execute a print job of a reserved printing at a print reservation time [7:00].

Then, in S104, the print driver obtains a current time [2017/5/1, 16:00:00] from a timer in the PC 102.

Then, the PC 102 generates a print job with print reservation time [2017/5/2, 7:00:00] in S105 and inputs the print job to the MFP 101 in S106.

In S107, the MFP 101 receives the print job from the PC 102.

Then in S108, the MFP 101 obtains the received time [2017/5/1, 16:00:00] as an input time from a timer 405 (see FIG. 4) of the MFP 101 itself. The obtaining the received time from the timer 405 in the MFP 101 itself may be obtaining it from an SNTP (Simple network time protocol) server (not illustrated) instead.

In S109 after obtaining the input time, the MFP 101 interprets bibliographic information (601 in FIG. 6) included in the print job.

In S110, the MFP 101 determines whether the print job is reserved printing or not. If it is determined that it is a reserved printing, the MFP 101 in S111 further obtains a print reservation time [2017/5/2, 7:00:00] from the print job.

After obtaining the input time and print reservation time, the MFP 101 in S112 compares the two times and determines whether the print reservation time is before the input time or not.

If it is determined that the print reservation time is not before the input time, the MFP 101 in S113 obtains the registered higher limit time [5:00] from the MFP 101 itself.

In S114, the MFP 101 compares a higher limit time [2017/5/1, 21:00:00] acquired by adding the higher limit time [5:00:00] to the current time [2017/5/1, 16:00:00] with the print reservation time [2017/5/2, 7:00:00]. Then, whether the print reservation time is after the higher limit time or not is determined. In this case, because the print reservation time [2017/5/2, 7:00] is after the higher limit time [2017/5/1, 21:00:00], the MFP 101 cancels the input print job.

In a case where the print reservation time is before the input time, the print job cannot be executed. Therefore, in S115, the MFP 101 cancels the print job. In other words, the input time is a lower limit time for the print reservation time.

In S116, after cancelling the print job, the MFP 101 adds information that the print job has been cancelled to update a job history list.

In S117, an error is notified to User 1 by displaying data on the job history list in the MFP 101.

Schematic Configuration of MFP 101

Figure 2:
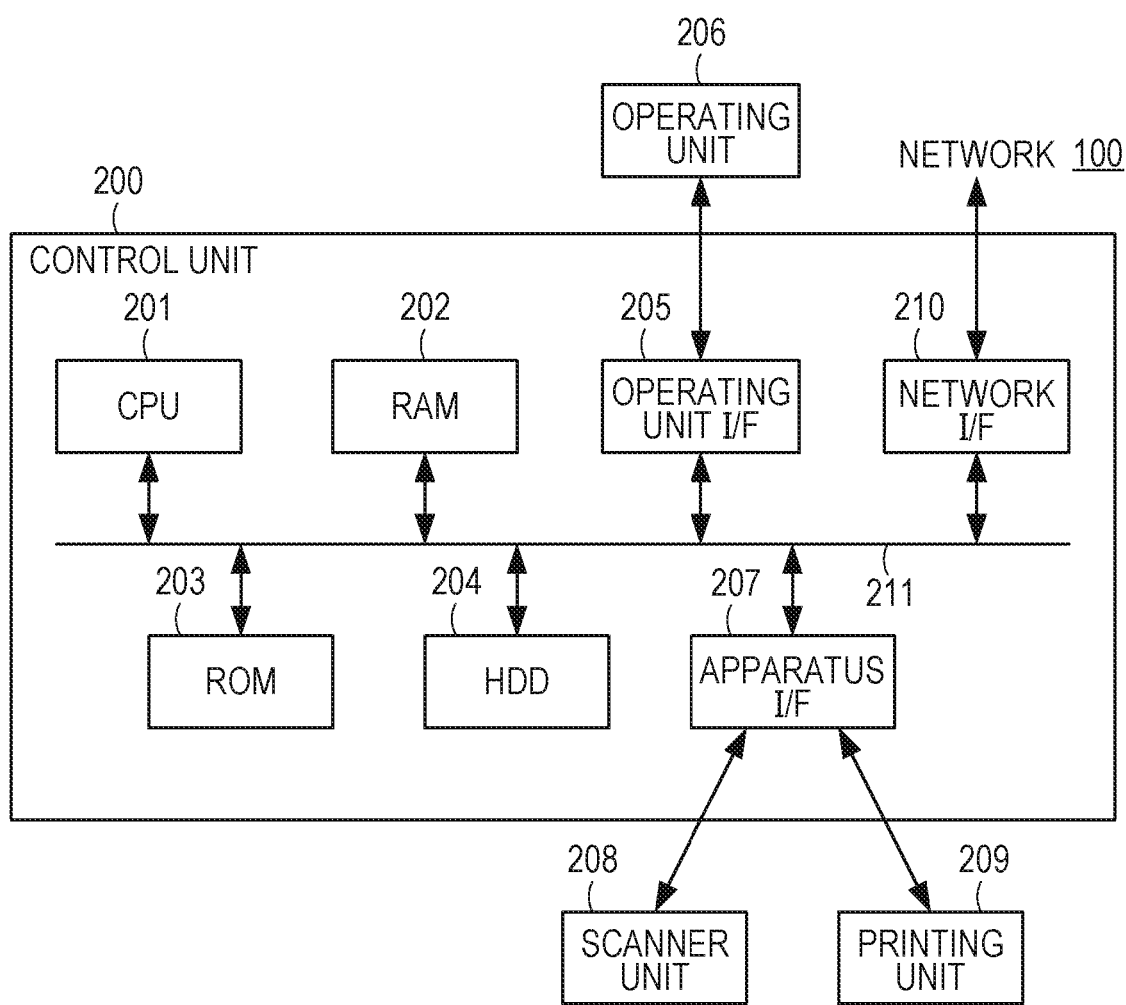
FIG. 2 is a block diagram illustrating a schematic configuration of an MFP.

FIG. 2 is a block diagram illustrating a schematic configuration of the MFP 101 according to Embodiment 1 of the present disclosure.

A controller unit 200 is a device configured to control the MFP 101. A CPU (Central Processing Unit) 201 is a computing device configured to control the entire system.

A RAM (random access memory) 202 stores programs such as an OS (operating system), system software, and application software and various data. A ROM (read only memory) 203 stores a system start-up program. The ROM 203 further stores a system program and application programs and data for image formation such as fonts.

An HDD 204 is configured to store a print job to be retained as a reserved printing. The HDD 204 further stores programs such as an OS, system software, application software and image data and setting data. Instead of the HDD 204, a flash memory such as an SSD (solid state drive) may be used.

The CPU 201, the RAM 202, the ROM 203, and the HDD 204 are connected with a bus 211. The CPU 201 is configured to execute a program stored on the RAM 202 via the bus 211 and to process image data and data excluding images stored in the ROM 203 or the HDD 204. I/Fs (interfaces) such as an operating unit I/F 205, a device I/F 207, and a network I/F 210 are also connected to the bus 211.

The operating unit I/F 205 is an interface unit to the operating unit 206 having a touch panel, and outputs image data to be displayed on the operating unit 206 to the operating unit 206. The operating unit I/F 205 is further configured to notify information input by a user through the operating unit 206 to the CPU 201.

The device I/F 207 connects a scanner unit 208 and a printer unit 209, which are image input/output devices, to the controller unit 200 and is configured to input/output image data.

The scanner unit 208 is configured to scan a paper document to acquire a print job including image data of the paper document. The printing unit 209 is configured to print and output image data included in the print job to execute a print job.

Image data input from the scanner unit 208 through the device I/F 207 are stored in the RAM 202 and the HDD 204. Image processing is executed on the stored image data by an application program stored in the RAM 202. Image data can also be output to the printer unit 209 via the device I/F 207. The scanner unit 208 may not be installed, like an SFP. In this case, image data may be input/output to/from an external apparatus on the network 100 via the network I/F 210.

Embodiments are not limited to the configuration in FIG. 2 if what the present disclosure provides can be provided.

For example, in a case of an MFP having a facsimile function, the controller unit 200 may have an I/F to a modem device, not illustrated in FIG. 2, and connect to a public communication line via the modem to enable facsimile communication. The controller unit 200 may further include a USB (Universal Serial Bus) I/F, not illustrated, such that the MFP 101 can read out and print image data stored in a flash memory card.

Schematic Configuration of PC 102

Figure 3:
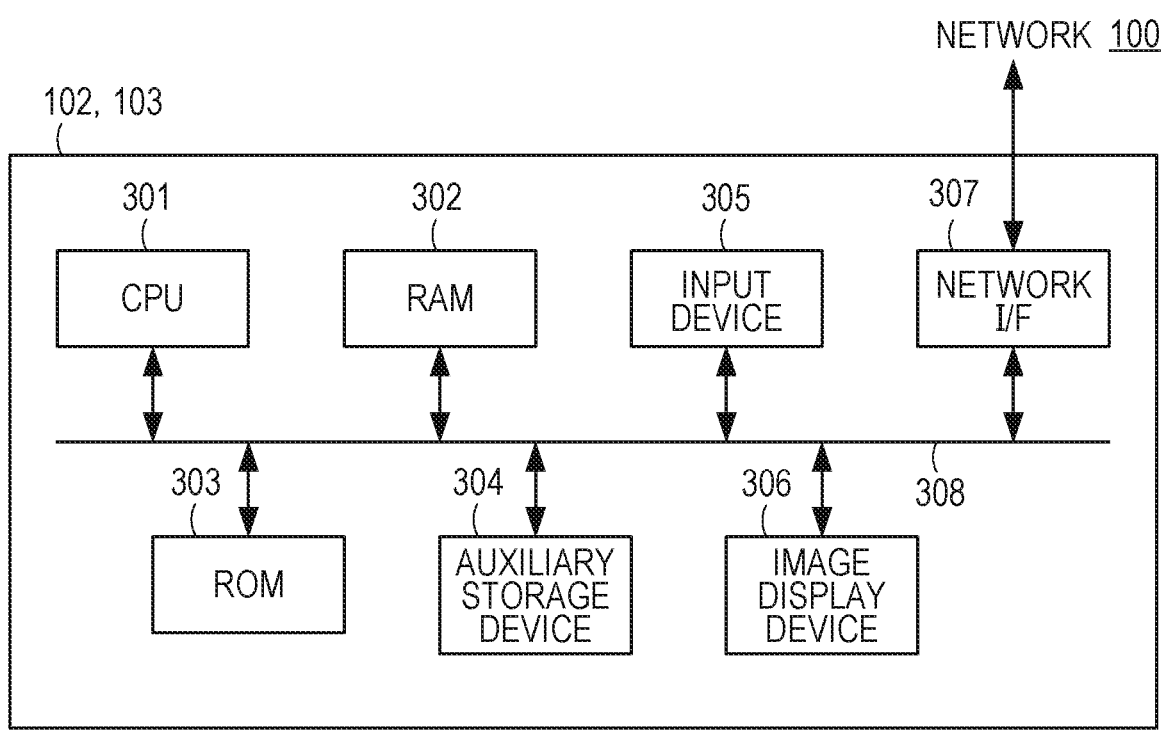
FIG. 3 is a block diagram illustrating an inner configuration of a PC.

FIG. 3 illustrates an example of an inner configuration of a general image processing apparatus and illustrates an inner configuration of the PCs 102 and 103 in FIG. 1.

A CPU 301 is configured to process information for controlling processing according to this embodiment. Particularly, the CPU 301 may read out a time when a user inputs a print job, a print reservation time designated by the user, and a higher limit time that the print job is executable from a RAM 302 and may determine whether the print reservation time is within a range of a predetermined time period in which a print job is executable.

The RAM 302 provides a work area for the CPU 301. The time when a user inputs a print job, the print reservation time designated by the user, and the higher limit time that the print job is executable are temporarily stored in the RAM 302.

An auxiliary storage device 304 is an HDD or an SSD configured to provide a control program according to this embodiment. An image display device 306 is a display device usable for the purpose of notification of a message to a user. An input device 305 is configured to provide a device, such as a mouse and a keyboard, through which a user can input. A network I/F 307 enables data exchange with another network connected apparatus over the network 100. A bus 308 is configured to connect the devices as described above.

Software Configuration of MFP 101

Figure 4:
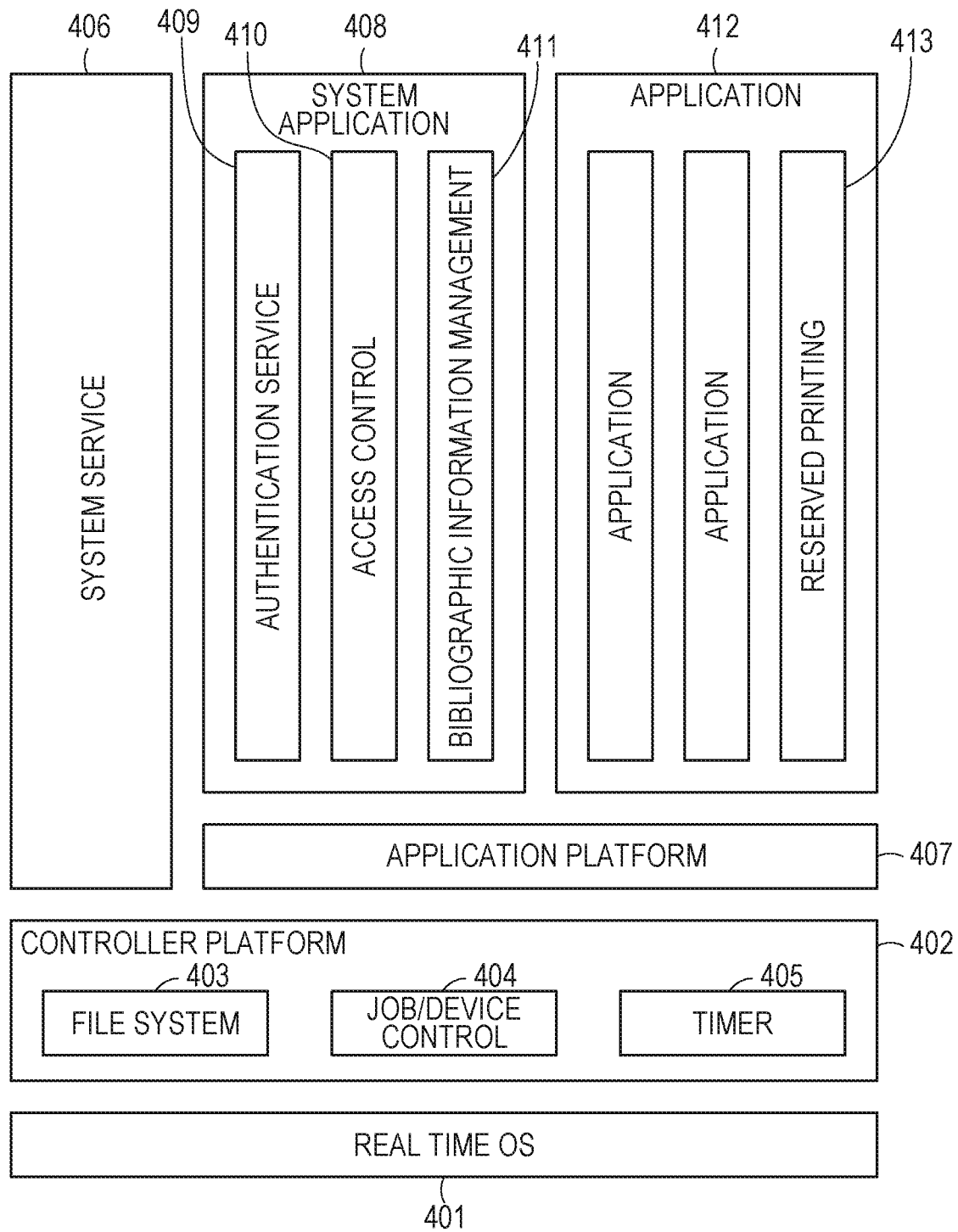
FIG. 4 is a block diagram illustrating a software configuration of the MFP.

FIG. 4 is a block diagram illustrating a software configuration of the MFP 101 according to Embodiment 1 of the present disclosure. This software is implemented in the controller unit 200 and is executed by the CPU 201.

A real time OS 401 provides resource management services and frameworks optimized for control over embedded systems to software that operates in its upper level. The resource management services and frameworks provided by the real time OS 401 may include multitask management and inter-task communication. The multitask management manages a plurality of contexts executable by the CPU 201 so that a plurality of processes can be operated substantially in parallel. The inter-task communication implements synchronization and data exchange between tasks.

Furthermore, protocol stacks are implemented which implement protocol processing to be used for memory management, interrupt processing, and different interfaces.

A controller platform 402 includes a file system 403, a job/device control 404, and a timer 405. Because the file system 403 stores data established on the RAM 202 and the HDD 204, the file system 403 is used for spooling a job handled by the controller unit 200 and saving various data. The job/device control 404 is configured to control hardware of the MFP 101 and to mainly control jobs using basic functions (print, scan, communication, image conversion) provided by the hardware. The timer 405 is configured to manage an expiration date and time of a license for each application.

A system service 406 is configured to monitor an operating state of the MFP 101 and to download software or a license from a software distribution server over the network 100.

An application platform 407 makes the real time OS 401 or the controller platform 402 available to a system application 408 and applications 412 that can be added.

The system application 408 includes an authentication service 409, an access control 410, and a bibliographic information management 411. The authentication service 409 is configured to find a match of a user name and a password input by a user through the operating unit 206 or over the network 100 within a user database stored in the HDD 204 to authenticate the user. For the authentication, an external authentication server may be used, without limiting to a user database held in the HDD 204.

The access control 410 is configured to control permission and prohibition of accesses to a job or a resource based on a user authority or a security setting. The bibliographic information management 411 is configured to manage bibliographic data of a print job. The bibliographic information management 411 includes a reservation table (see FIG. 7) and holds it in the HDD 204.

The applications 412 can display an operation menu on the operating unit 206 and can receive an input from a user and can provide a service implemented by the MFP 101 to a user. A reserved printing 413 is one of the applications 412 and is configured to determine whether a print job is a reserved printing or not, to display a list of reserved print jobs, to perform print out and so on.

Print Driver Screen

Figure 5:
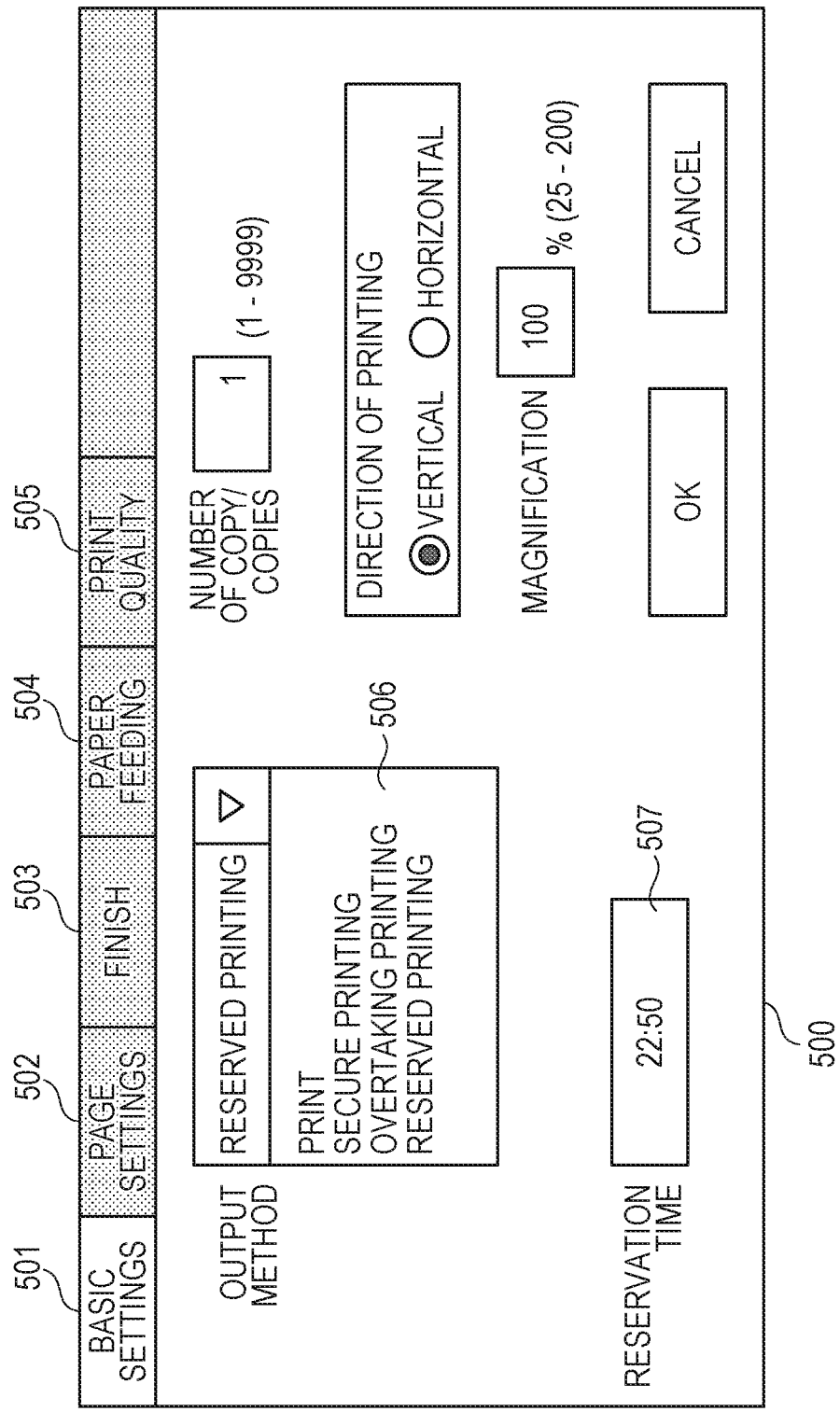
FIG. 5 illustrates a print driver screen.

FIG. 5 illustrates an example of a screen for a print driver installed in the PC 102 according to Embodiment 1 of the present disclosure.

The printer driver presents a screen 500. The screen has tabs 501 to 505 including a BASIC SETTINGS tag 501, a PAGE SETTINGS tab 502, a FINISH tab 503, a PAPER FEEDING tab 504, and a PRINT QUALITY tab 505. When one of the tabs is selected, the corresponding setting screen can be displayed.

The BASIC SETTINGS tab 501 presents in a pull-down form an output method menu 506 of output methods including printing, secure printing, overtaking printing, reserved printing, previewing, one of which can be selected. The reserved printing is selected in the output method menu 506, a print job for a reserved printing can be generated. The secure printing is a function for pending printing until a user is directly personally authenticated even when a print processing job is submitted.

A reservation time menu 507 presents a print execution time which is set for a reserved printing in a free form. By setting a time in an hh:mm form in the reservation time menu 507, the printing can be executed at the designated time. The reservation time menu 507 is configured to receive an input when a reserved printing is designated in the output method menu 506.

The PAGE SETTINGS tab 502 has a menu for setting a page layout and a magnification for an output image. The FINISH tab 503 has a menu for selecting simplex or duplex printing, setting a binding direction, and setting a discharge method, for example. The PAPER FEEDING tab 504 has a menu for selecting which paper feed stage in the MFP 101 is to be used for output. The print quality 505 has a menu for defining quality of output image such as a color mode (polychrome/monochrome) and a resolution.

Configuration of Print Job

Figure 6:
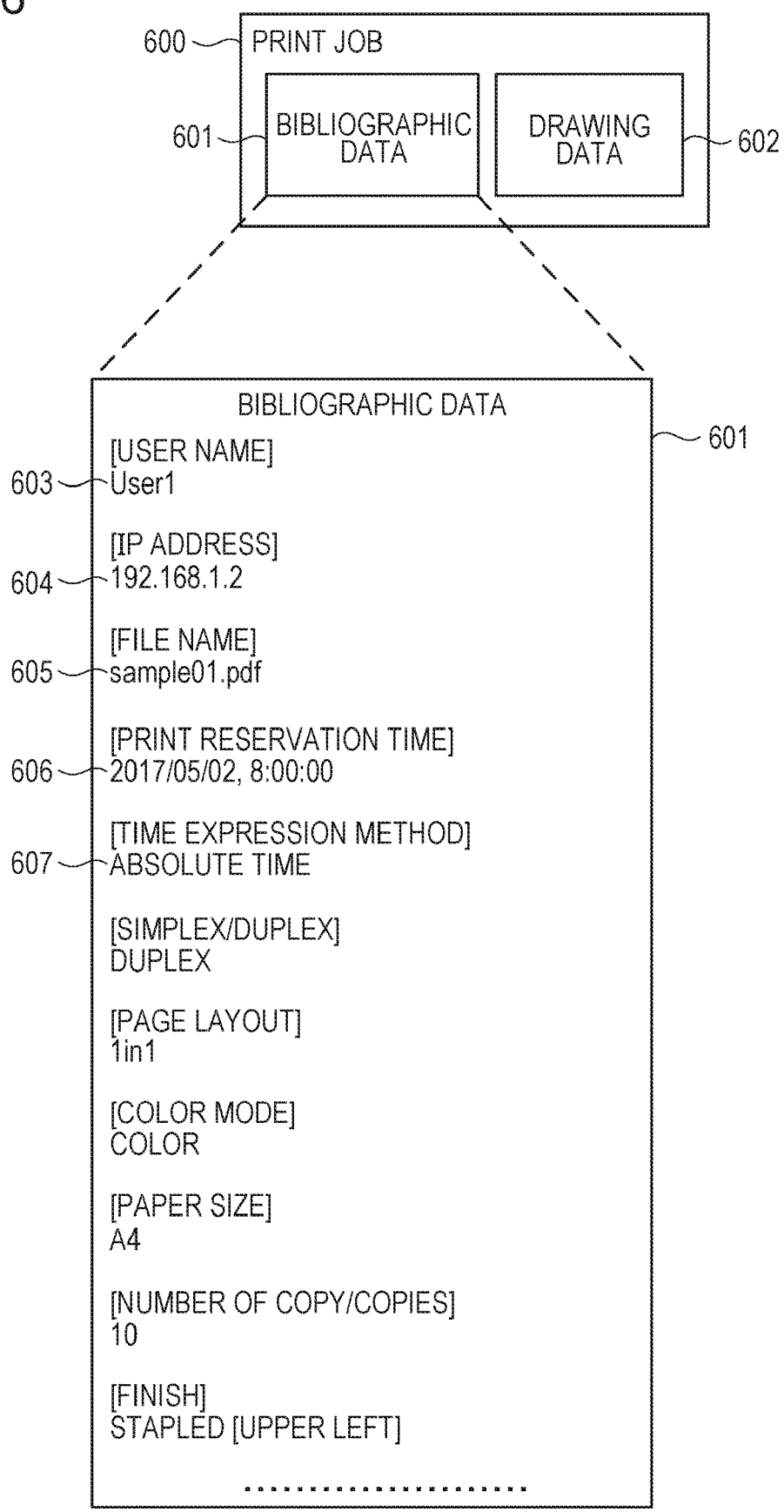
FIG. 6 illustrates a data configuration of a print job.

FIG. 6 illustrates an example of a data configuration of a print job according to Embodiment 1 of the present disclosure.

A print job 600 includes bibliographic data 601 and drawing data 602.

The bibliographic data 601 store a user name 603, an IP address 604, a file name 605, a print reservation time 606, a time expression method 607 and other setting information relating to the PC 101 and setting items defined in the print driver 500.

The user name 603 is an item storing a user account of the PC 102 used when the print job 600 is generated. The IP address 604 is an item storing an IP address of the PC 102 used for generating the print job 600. The file name 605 is an item storing a file name of an application file that is a source of the print job.

The print reservation time 606 is an item storing a time at which printing is to be executed. While the reservation time menu 507 has a time in an hh:mm form, the year, month and date value YY/MM/DD is obtained from the PC 102 and is written under the print reservation time 606. The second ss is rounded off to 00. The print reservation time 606 is added to the bibliographic data when a reserved printing is set as the output method 506 on the printer driver 500. The MFP 101 judges whether the print job 600 is a reserved printing or not based on the presence/absence of the print reservation time 606.

The time expression method 607 is an item storing a value indicating whether the time presented in the print reservation time 606 is an absolute time or a relative time. The bibliographic data 601 has other items storing values indicating a selection of simplex or duplex printing, a page layout, a paper size, a finish method and so on.

The drawing data 602 stores data for generating an image to be output such as graphic pattern data, photographic data, and text data.

Management Method for Reserved Printing

FIG. 7 illustrates an example of a reservation table 700 within the MFP 101 for managing print jobs to be executed by reserved printing according to Embodiment 1 of the present invention.

In a case where a print job 600 is to be executed by reserved printing, after the print job 600 is input from the PC 102 to the MFP 101, the MFP 101 analyzes the bibliographic data 601, and the analysis result is managed on the reservation table 700.

The reservation table 700 manages items of a user name 701, an input time 702, a reservation time 703, an IP address 704, a file path 705, a file name 706 and a print settings 707. According to the reserved printing, MFP 101 accesses the reservation table 700 periodically (such as once per minute). The MFP 101 compares the reservation time 703 of the print job 600 and the current time. If it is determined that the current time passes the reservation time 703, printing is executed.

The user name 701 stores the user name 603 stored in the bibliographic data 601. The input time 702 stores the year, month, day, and time YYYY/MM/DD/hh:mm obtained from the timer 405 that is the time when the MFP 101 receives the print job 600 from the PC 102. The second ss is rounded off to 00. The reservation time 703 stores the print reservation time 606 stored in the bibliographic data 601.

The IP address 704 indicates the IP address of the MFP 101 holding the print job 600. In a case where the print job 600 is held in an external apparatus connected with the MFP 101 over the network 100, the IP address 704 indicates the IP address of the external apparatus. The file path 705 is a hierarchical level on the file system 403 storing the print job 600.

The file name 706 stores the file name 605 stored in the bibliographic data 601. The print settings 707 stores values indicating simplex/duplex printing, a page layout, a paper size, a finish method and so on stored in the bibliographic data 601.

Configuration of Reservation List Screen 800

Figure 8:
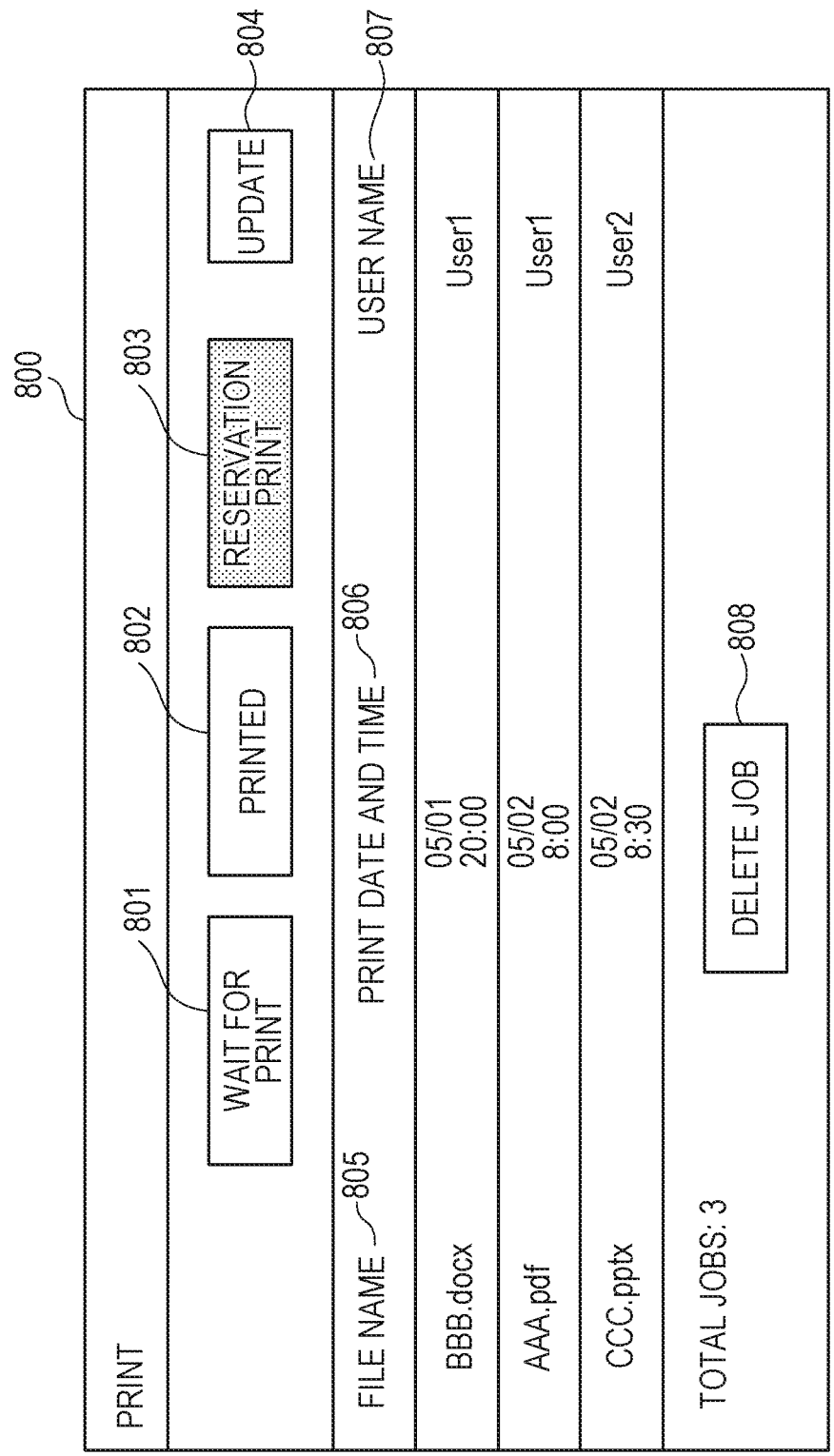
FIG. 8 illustrates a screen on a panel operating unit of the MFP, which displays a list of reserved print jobs.

FIG. 8 illustrates an example of a reservation list screen 800 to be displayed on the operating unit 206 of the MFP 101 according to Embodiment 1 of the present disclosure. Here, the reservation list screen 800 displays a list of print jobs 600 managed in the reservation management table 700.

A WAIT FOR PRINT button 801, a PRINTED button 802, and a RESERVED PRINT button 803 are buttons usable by a user for selecting a list to display. The WAIT FOR PRINT button 801 is a button for notifying the MFP 101 of an instruction to cause the operating unit (panel display unit) 206 to display a print job list of secure prints retained in the MFP 101. The PRINTED button 802 is a button for notifying the MFP 101 of an instruction to cause the panel display unit 206 to display a list of executed print jobs relating to secure prints retained in the MFP 101. The RESERVED PRINT button 803 is a button for notifying the MFP 101 of an instruction to cause the panel display unit 206 to display a print job list of reserved printings retained in the MFP 101. FIG. 8 assumes that the RESERVED PRINT button 803 is to be pressed by a user and that a list of reserved printings is displayed.

An UPDATE button 804 is a button for notifying the MFP 101 of instructions to read the reservation table 700 again and to update the contents displayed on the operating unit (panel display unit) 206 to the latest state of the reservation table 700. A FILE NAME field 805 displays file names of the print jobs 600 retained as reserved printings. The FILE NAME field 805 displays the file names 706 stored in the reservation table 700. A PRINT DATE AND TIME field 806 displays a time when a reserved printing is to be executed. The print date and time uses the values in the reservation time 703 stored in the reservation table 700. A USER NAME field 807 displays an account name of a user who is an owner of a print job 600 stored as a reserved printing. The user name corresponds to the user name 701 in the reservation table 700.

A DELETE JOB button 808 is a button for deleting a print job 600 retained in the MFP 101. A user may press a print job 600 to be deleted on the panel operating unit 206 and may then press the DELETE JOB button 808 so that the user can notify the MFP 101 of an instruction to delete the print job 600. The deleted print job 600 is deleted from the reservation job table 700 and is also deleted from the reservation list screen 800.

Configuration of Print History List Screen 900

Figure 9:
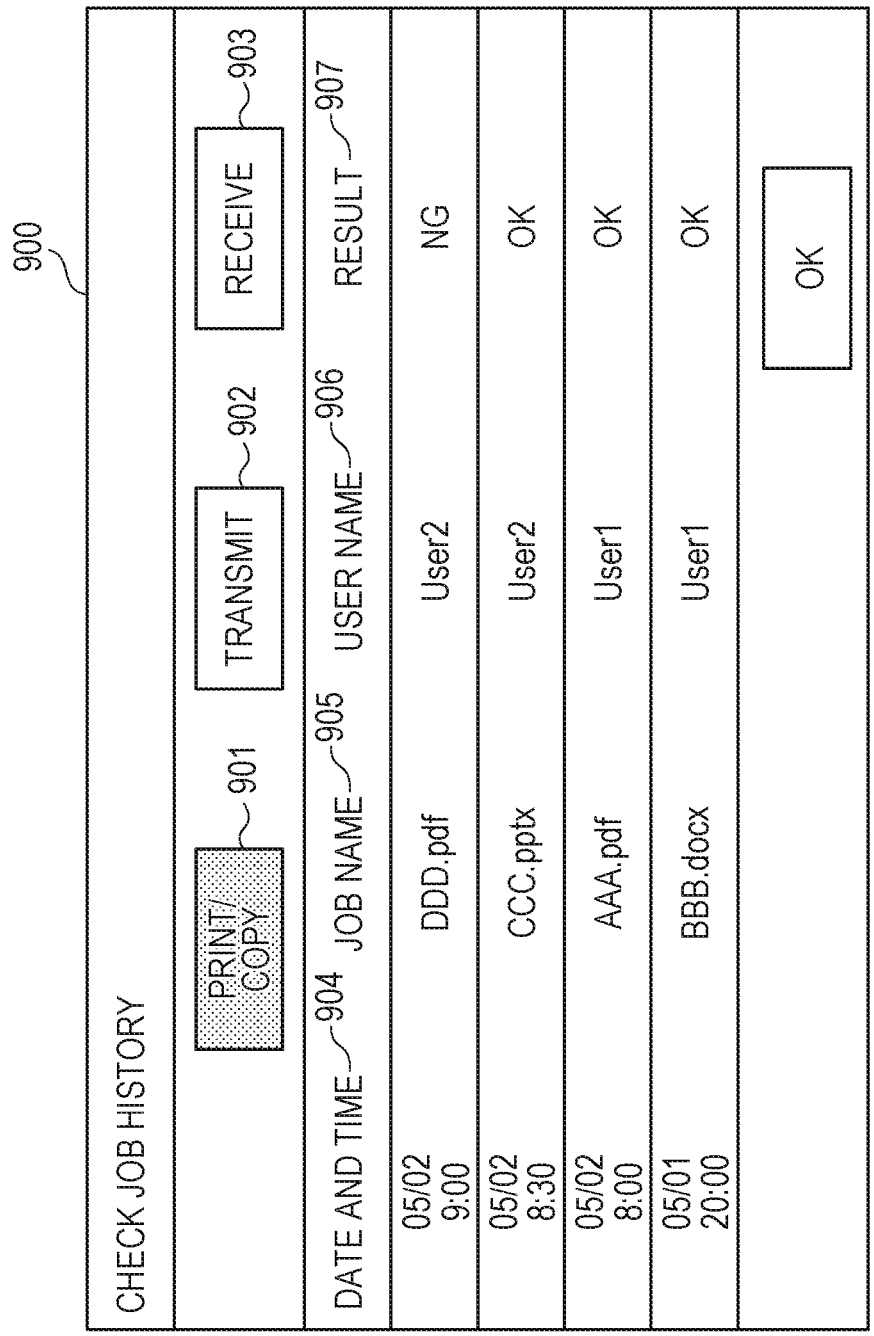
FIG. 9 illustrates a screen on the panel operating unit of the MFP which displays a list of logs of executed print jobs.

FIG. 9 is a display screen on the operating unit 206 in the MFP 101 according to Embodiment 1 of the present disclosure. FIG. 9 illustrates an example of a print history list screen 900 displaying a list of execution results of the print job 600 which are held as logs.

A PRINT/COPY button 901, a TRANSMIT button 902, and a RECEIVE button 903 are buttons for selecting a list of displayed logs by a user. The PRINT/COPY button 901 is usable for notifying the MFP 101 of the instruction to display a list of logs of executions of a job using, for example, a print function and a copy function of the printing unit 209. The TRANSMIT button 902 is usable for notifying the MFP 101 of an instruction to display a list of execution logs of a job such as transmitting or facsimileing image data from the MFP 101 to an external apparatus connected to the network 100. The RECEIVE button 903 is usable for notifying the MFP 101 of an instruction to receive by the MFP 101 image data transmitted from an external apparatus connected to the network 100 and to display a list of execution logs of a job such as a facsimile transmission.

Referring to FIG. 9, the PRINT/COPY button 901 may be pressed by a user, and a list of execution logs of the print and copy is displayed.

A DATE AND TIME field 904 displays the date and time when the print job 600 is executed, which is obtained from the timer 405. A JOB NAME field 905 displays a job name 605 of the executed print job 600. A USER NAME field 906 displays a user name 603 of the executed print job 600.

A RESULT field 907 displays OK if printing has been executed up to its output without problems. On the other hand, the RESULT field 907 displays NG and the print job 600 is cancelled if the MFP 101 detects an operation instruction that is not allowed from a print job upon input or execution of the print job 600.

When the RESULT field 907 displays NG, the cancelled time is displayed in the DATE AND TIME field 904.

Processing for Inputting Print Job 600

Figure 10:
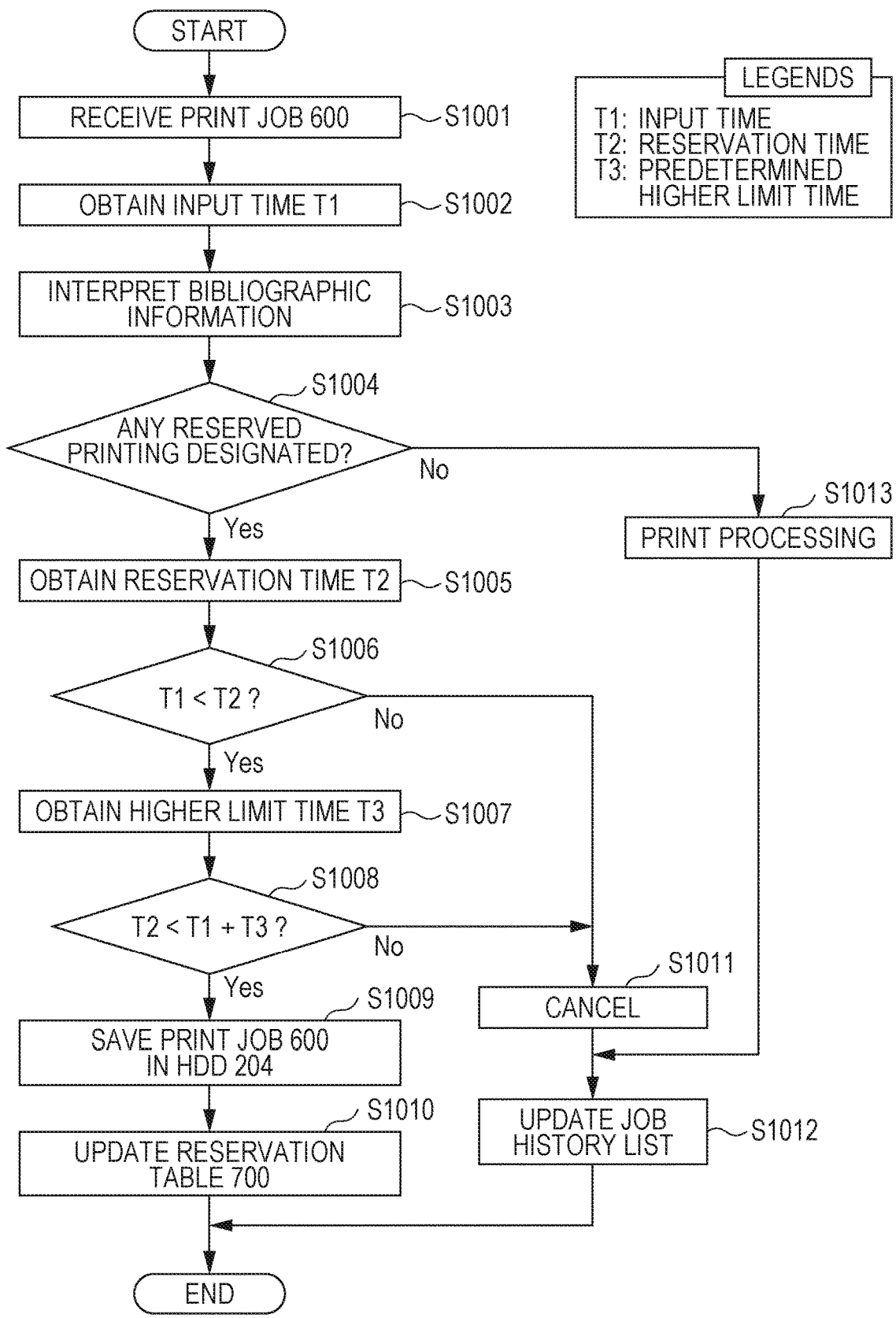
FIG. 10 is a flowchart illustrating processing for inputting a print job to the MFP.

FIG. 10 is a flowchart illustrating processing for inputting a print job 600 to be executed by the MFP 101 according to Embodiment 1 of the present disclosure.

In S1001, the CPU 301 receives a print job 600 transmitted from the PC 102.

In S1002, the CPU 301 obtains the current time of the MFP 101 from the timer 405 and holds it as an input time T1.

In S1003, the CPU 301 interprets the bibliographic data 601 of the print job 600.

In S1004, the CPU 301 determines whether the bibliographic data 601 includes a print reservation time 606 or not. If so, it means that reserved printing is designated. Therefore, the CPU 301 advances the processing to S1005. If not, it means that reserved printing is not designated. Therefore, the CPU 301 advances the processing to S1013.

In S1005, the CPU 301 obtains from the bibliographic data 601 a reservation time T2 that is a time for executing printing.

In S1006, the CPU 301 compares in magnitude between the values of the input time T1 and the reservation time T2. If it is determined that the reservation time T2 is higher than the input time T1 as a result of the magnitude comparison, it is determined that the reservation time is after the input time. The CPU 301 advances the processing to S1007. On the other hand, if it is determined that the input time T1 is equal to or higher than the reservation time T2, it is determined that the reservation time is at or before the input time. The CPU 301 advances the processing to S1011. In S1011, it is determined that the time for printing has already passed, and the CPU 301 cancels the execution of the printing.

In S1007, the CPU 301 obtains a predetermined higher limit time T3.

In S1008, the CPU 301 compares in magnitude the reservation time T2 and a value acquired by adding the higher limit time T3 to the input time T1. If it is determined that the value acquired by adding the higher limit time T3 to the input time T1 is higher than the reservation time T2 as a result of the magnitude comparison, it is determined that the reservation time T2 is allowed for reservation. The CPU 301 advances the processing to S1009. On the other hand, if it is determined the reservation time T2 is higher, it is determined the reservation time T2 is not allowed for reservation. The CPU 301 advances the processing to S1011.

In S1009, the CPU 301 holds the print job 600 in the HDD 204.

In S1010, the CPU 301 adds information of the bibliographic data 601 relating to the print job 600 to the reservation table 700 as processing for updating the reservation table 700.

In S1011, the CPU 301 performs processing for cancelling the print job 600.

In S1012, the CPU 301 adds OK or NG as a result of the execution of the print job 600 to the RESULT field 907 in the job history list 900.

In S1013, because the reserved printing is not set, the CPU 301 executes print processing on the print job 600 without delay.

Print Job Output Processing

Figure 11:
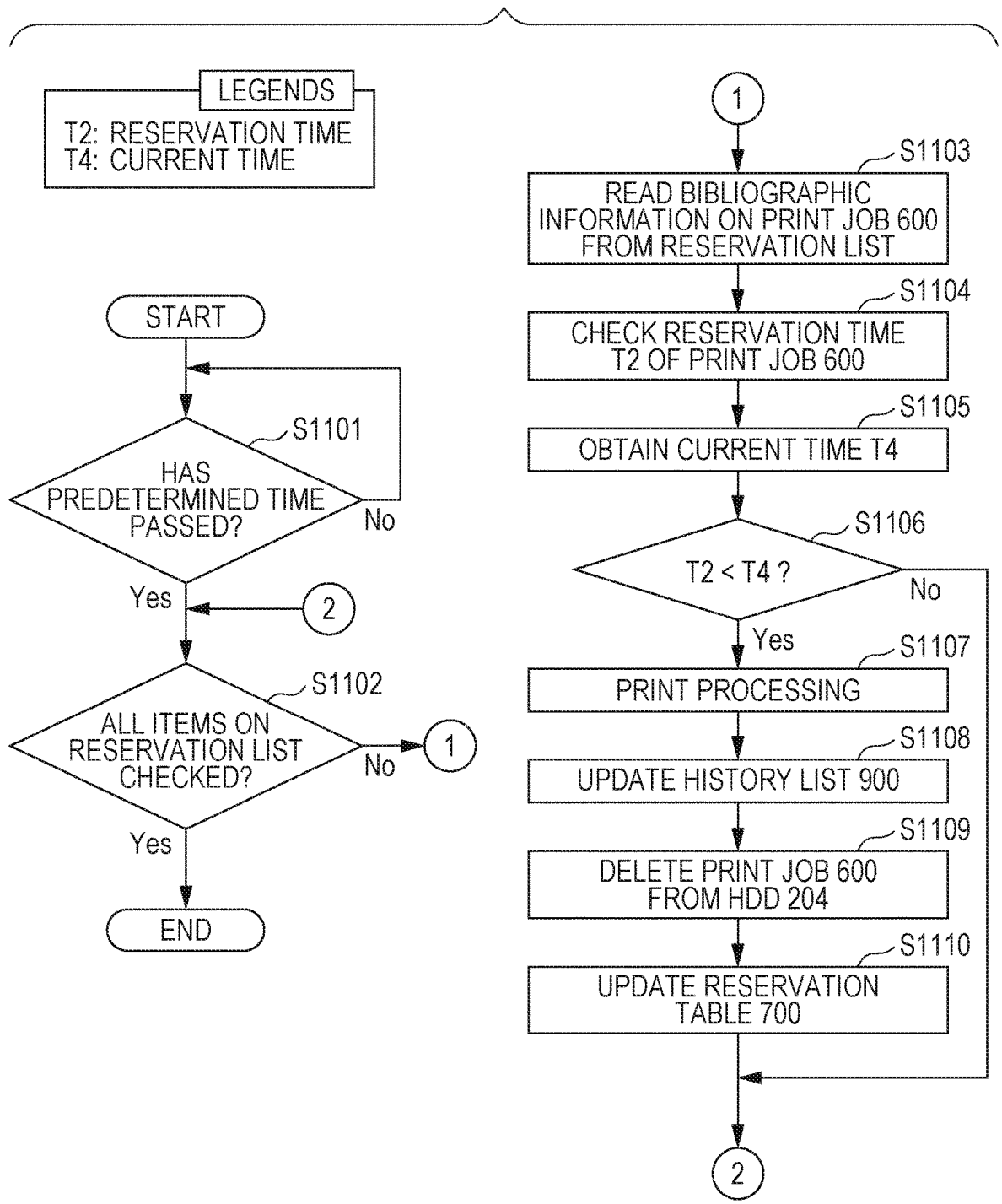
FIG. 11 is a flowchart illustrating processing for outputting a print job from the MFP.

FIG. 11 is a flowchart illustrating output processing for a print job to be executed by the MFP 101 according to Embodiment 1 of the present disclosure.

In S1101, the CPU 301 waits for a predetermined period of time (such as one minute) and, after a lapse of the predetermined period of time, the processing moves to S1102.

In S1102, the CPU 301 determines whether there is any print job 600 that is not checked on the reservation list 700 or not. If so, the CPU 301 advances the processing to S1103. If not, the processing ends.

In S1103, the CPU 301 reads information pieces 701 to 707 relating to the print job 600 from the reservation table 700.

In S1104, the CPU 301 obtains a reservation time 703 as the reservation time T2.

In S1105, the CPU 301 obtains the current time T4 from the timer 405.

In S1106, the CPU 301 compares in magnitude between values of the reservation time T2 and the current time T4. If the time T4 is higher as a result of the comparison in magnitude, it is judged that the current time T4 has reached the start time of the print processing of the print job 600.

Therefore, the CPU 301 advances the processing to S1106. If the current time T4 is lower, it is judged the print processing start time for the print job 600 has not reached. Therefore, the CPU 301 advances the processing to S1102.

In S1107, the CPU 301 executes the print processing on the print job 600.

In S1108, the CPU 301 adds OK as an execution result to the RESULT field 907 in the job history list 900 to update the job history list 900.

In S1109, the CPU 301 deletes the print job 600 having undergone the print processing from the HDD 204.

In S1110, the CPU 301 deletes the information on the print job 600 having undergone print processing, as update processing on the reservation table 700.

Setting Higher Limit Time

Figure 12:
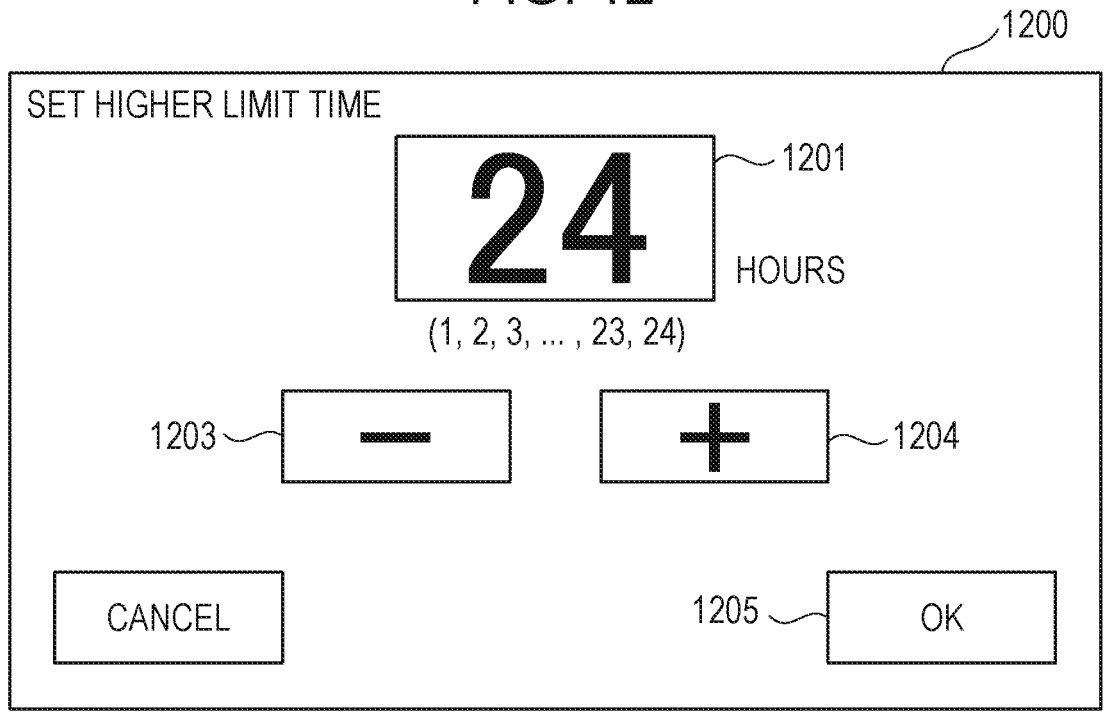
FIG. 12 illustrates a screen on a panel operating unit in the MFP for setting a higher limit time that can be reserved.

FIG. 12 is a display screen on the operating unit 206 in the MFP 101 according to Embodiment 1 of the present disclosure. FIG. 12 illustrates an example of a higher limit time setting screen for setting the predetermined higher limit time T3 illustrated in FIG. 10.

A higher limit time display window 1201 indicates a value of a currently set higher limit time. A minus button 1203 may be pressed to notify the MFP 101 of an instruction to decrement by 1 the numerical value displayed in the higher limit time display window 1201. A plus button 1203 may be pressed to notify the MFP 101 of an instruction to increment by one the numerical value displayed in the higher limit time display window 1201.

Although the range of the input value is 1, 2, 3, . . . , 24 in this example, the range can be extended, or more detail values may be included in the range.

An OK button 1205 may be pressed to notify the MFP 101 of an instruction to update the higher limit time T3 with the value displayed in the higher limit time display window 1201.

Higher Limit Time Update Processing

Figure 13:
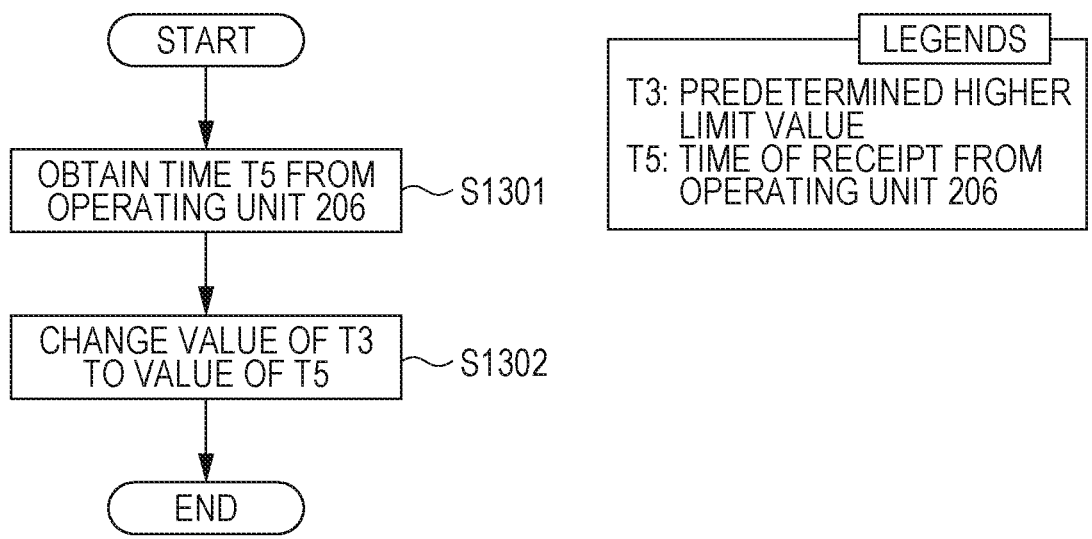
FIG. 13 is a flowchart illustrating processing for changing a higher limit time setting that can be reserved.

FIG. 13 is a flowchart illustrating an update processing for the higher limit time T3 relating to the reserved printing in the MFP 101 according to Embodiment 1 of the present disclosure.

In S1301, the CPU 301 in response to the notification from the operating unit 206 obtains a changed time T5.

In S1302, the CPU 301 updates the value of the higher limit time T3 with the changed time T5. The value of the changed higher limit time T3 is held in the HDD 204 so that the updated information is prevented from being erased even when the MFP 101 is rebooted. The MFP 101 responds with its capability to the PC 102, the PC 102 obtains the higher limit time so that the settable reserved printing time range that can be designated on the printer driver can be changed.

Embodiment 2

Figure 14:
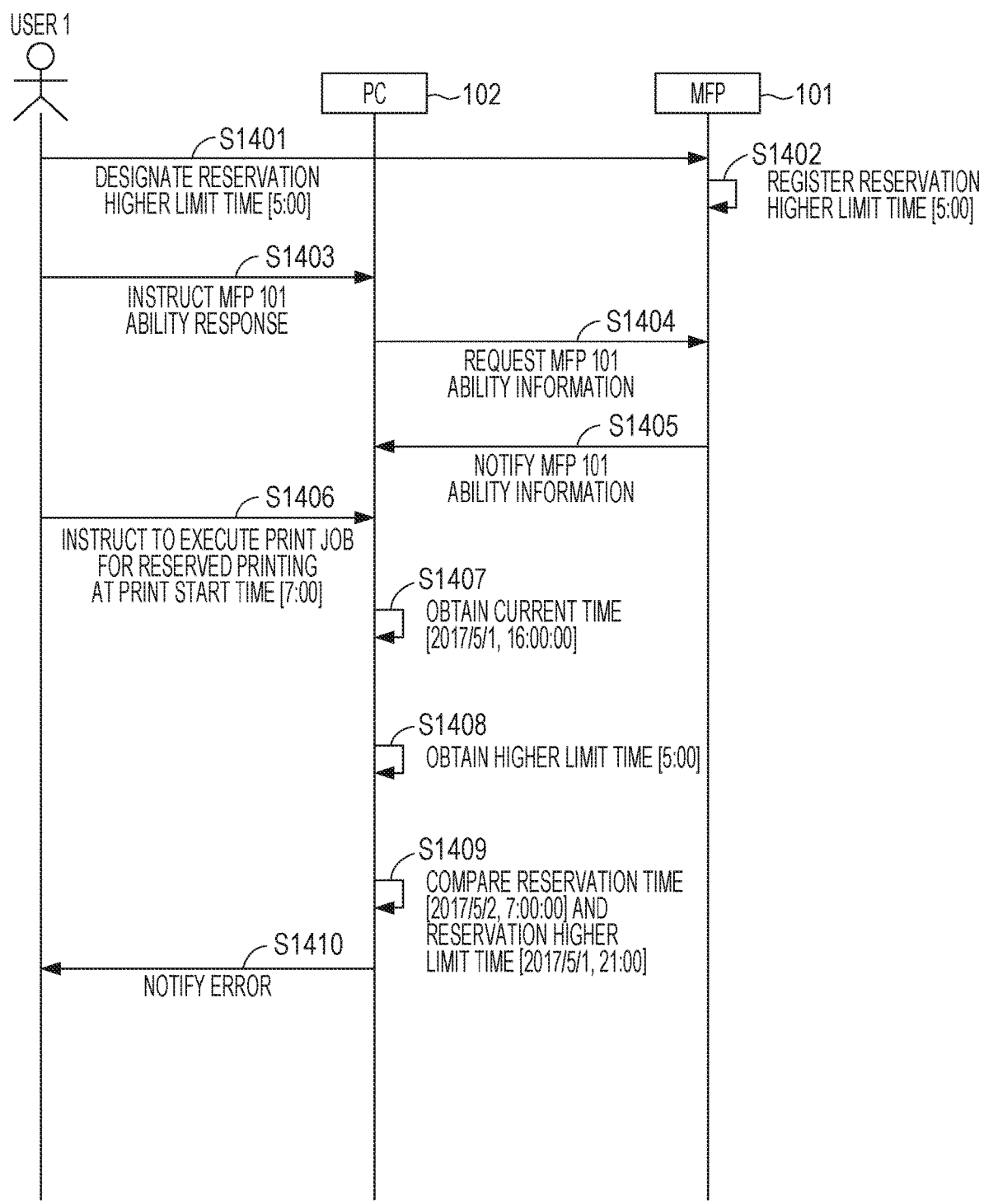
FIG. 14 illustrates a processing sequence according to Embodiment 2.

Embodiment 2 will be described with reference to an example in which when a user instructs to execute a print job involving reserved printing on the PC 102, the PC 102 notifies the user of an error that the reserved printing is disabled as illustrated in FIG. 14.

FIG. 14 illustrates an example of a processing sequence to be performed in a print management system according to the present disclosure.

In S1401, User 1 designates [5:00] as a reservation higher limit time to the MFP 101.

In S1402, in response to the designation of the reservation higher limit time from User 1, the MFP 101 registers the reservation higher limit time as [5:00:00].

Next, in S1403, User 1 instructs the MFP 101 to respond with its capability on the PC 102 through the print driver.

In S1404, the PC 102 in response to the instruction from User 1 requests the MFP 101 to respond with its capability.

Then, in S1405, the MFP 101 notifies the PC 102 of information regarding the reservation higher limit time registered with the MFP 101 itself and information on an accessory device connected to the MFP 101 itself, for example.

Next, in S1406, User 1 instructs the execution of the print job 600 involving reserved printing at the print reservation time [7:00].

In response to the instruction of the execution of the print job 600 involving the reserved printing by User 1, the PC 102 in S1407 obtains the current time [2017/5/1, 16:00:00] managed by the PC 102 itself.

Next, in S1408, the PC 102 based on the capability response as described above obtains the reservation higher limit time [5:00:00] notified from the MFP 101.

In S1409, the PC 102 compares a higher limit time [2017/5/1, 21:00:00] acquired by adding a higher limit time [5:00:00] to the current time [2017/5/1, 16:00:00] and a print reservation time [2017/5/2, 7:00:00]. Whether the print reservation time is after the higher limit time or not is determined.

In this example, the print reservation time [2017/5/2, 7:00] is after the higher limit time [2017/5/1, 21:00:00]. Therefore, in S1410, the PC 102 notifies User 1 of an error that the instruction to execute the reserved printing on the print job 600 by User 1 is disabled.

Because details of Embodiment 2 excluding the processing sequence described with reference to FIG. 14 overlap those of Embodiment 1, any repetitive descriptions will be omitted.

Embodiment 3

An example according to Embodiment 3 will be described in which a print driver having a range that can be uniquely customized by a user and that can be designated as a print reservation time, which is extended to the year, month and day YYYY/MM/DD, is used and in which the MFP 101 notifies a user of an error that the reserved printing is disabled.

By using such a print driver, a user can generate a print job 600 for reserved printing, which is retained in the MFP 101 for a significantly long time period, such as 10 or 20 years, from the input to print of the job 600. Retention of a print job 600 to be executed in remote future in the MFP 101 may easily generate an area of a resource of the HDD 204 that is not released (or substantially not released) for a long time period. Reserving many print jobs 600 for printing may cause a problem that the resource of the HDD 204 may be exhausted.

Figure 15:
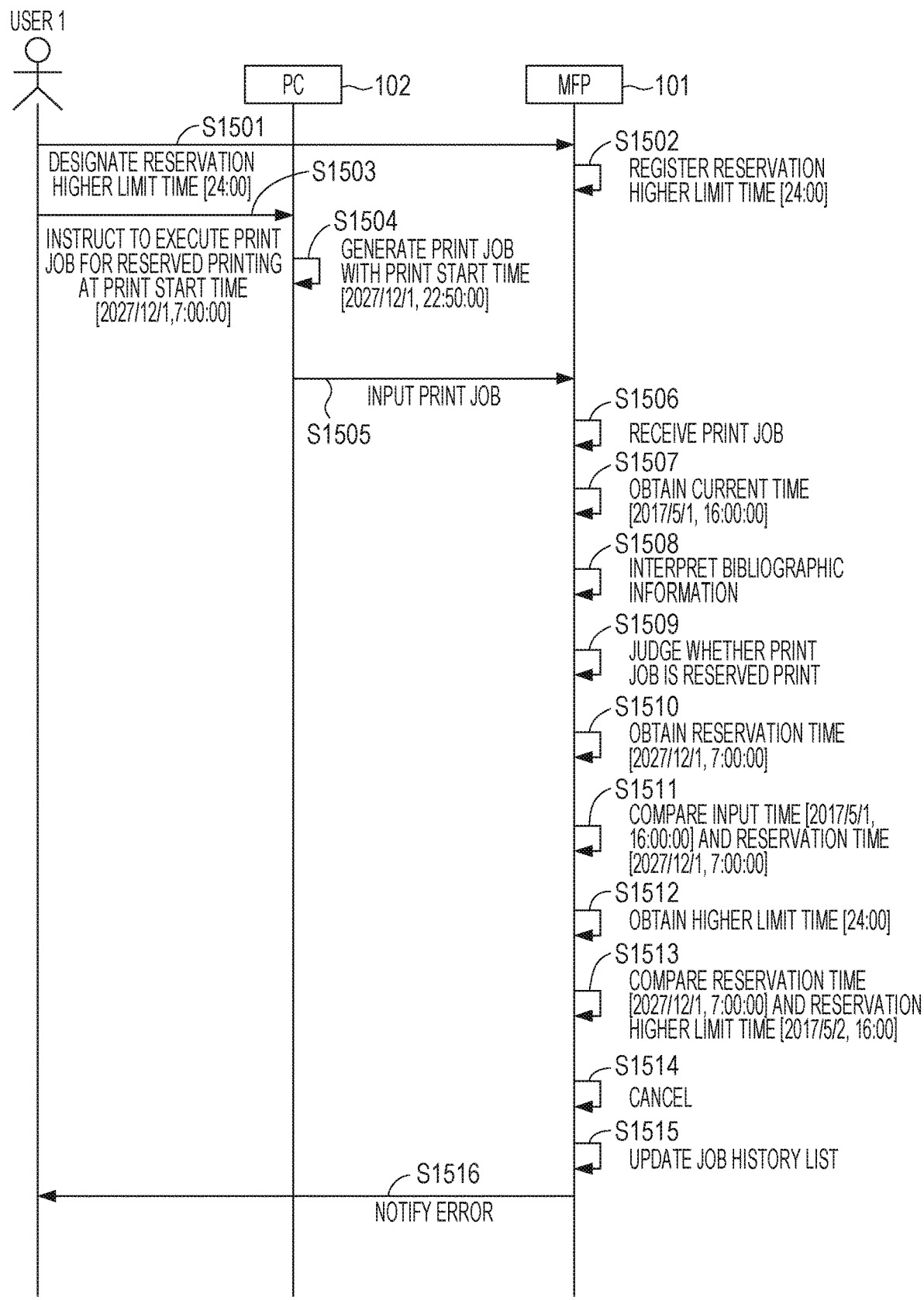
FIG. 15 illustrates a processing sequence according to Embodiment 3.

In view of this, according to Embodiment 3, a processing sequence in an example in which a print job setting a reserved printing with a print reservation time of 10 years away when the job is input to the MFP 101 will be described with reference to FIG. 15.

In S1501, User 1 designates [24:00] as a reservation higher limit time to the MFP 101.

In response to the designation of the reservation higher limit time from User 1, the MFP 101 in S1502 registers [24:00:00] as a reservation higher limit time.

Next, in S1503, User 1 instructs the print driver on the PC 102 to execute the print job 600 for reserved printing at a print reservation time [2027/12/01, 7:00:00].

In S1504, the print driver generates a print job 600 to be executed at the print reservation time [2027/5/2, 7:00:00] as designated by User 1.

Then in S1505, the print job 600 is input to the MFP 101.

S1506, the MFP 101 receives the print job 600 from the PC 102.

Then in S1507, the time of the receipt [2017/5/1, 16:00:00] is obtained as an input time from the timer in the MFP 101 itself. The time of the receipt may be obtained from an SNTP server instead of the timer in the MFP 101 itself.

After the input time is obtained, the MFP 101 in S1508 interprets the bibliographic information 601 included in the print job 600.

Then, in S1509, whether the print job is reserved printing or not is determined.

If so, a print reservation time [2027/12/1, 7:00:00] is further obtained from the print job 600 in S1510.

In S1511, the MFP 101 after obtaining the input time and the print reservation time compares these two times to determine whether the print reservation time is before the input time or not.

If it is determined that the print reservation time is after the input time, the MFP 101 in S1512 obtains a registered higher limit time [24:00] from the MFP 101 itself.

In S1513, the MFP 101 compares a higher limit time [2017/5/2, 16:00:00] acquired by adding the higher limit time [24:00:00] to the current time [2017/5/1, 16:00:00] and the print reservation time [2027/12/1, 7:00:00]. Then, whether the print reservation time is after the higher limit time or not is determined.

In this example, because the print reservation time [2027/12/2, 7:00] is after the higher limit time [2017/5/2, 16:00:00], the MFP 101 in S1514 cancels the input print job 600.

The MFP 101 after canceling the print job 600 adds information that the job has been cancelled in S1515 to update the job history list. In S1516, contents of the job history list in the MFP 101 are displayed on the operating unit 206 so that the error is notified to User 1.

Customized Print Driver Screen

Figure 16:
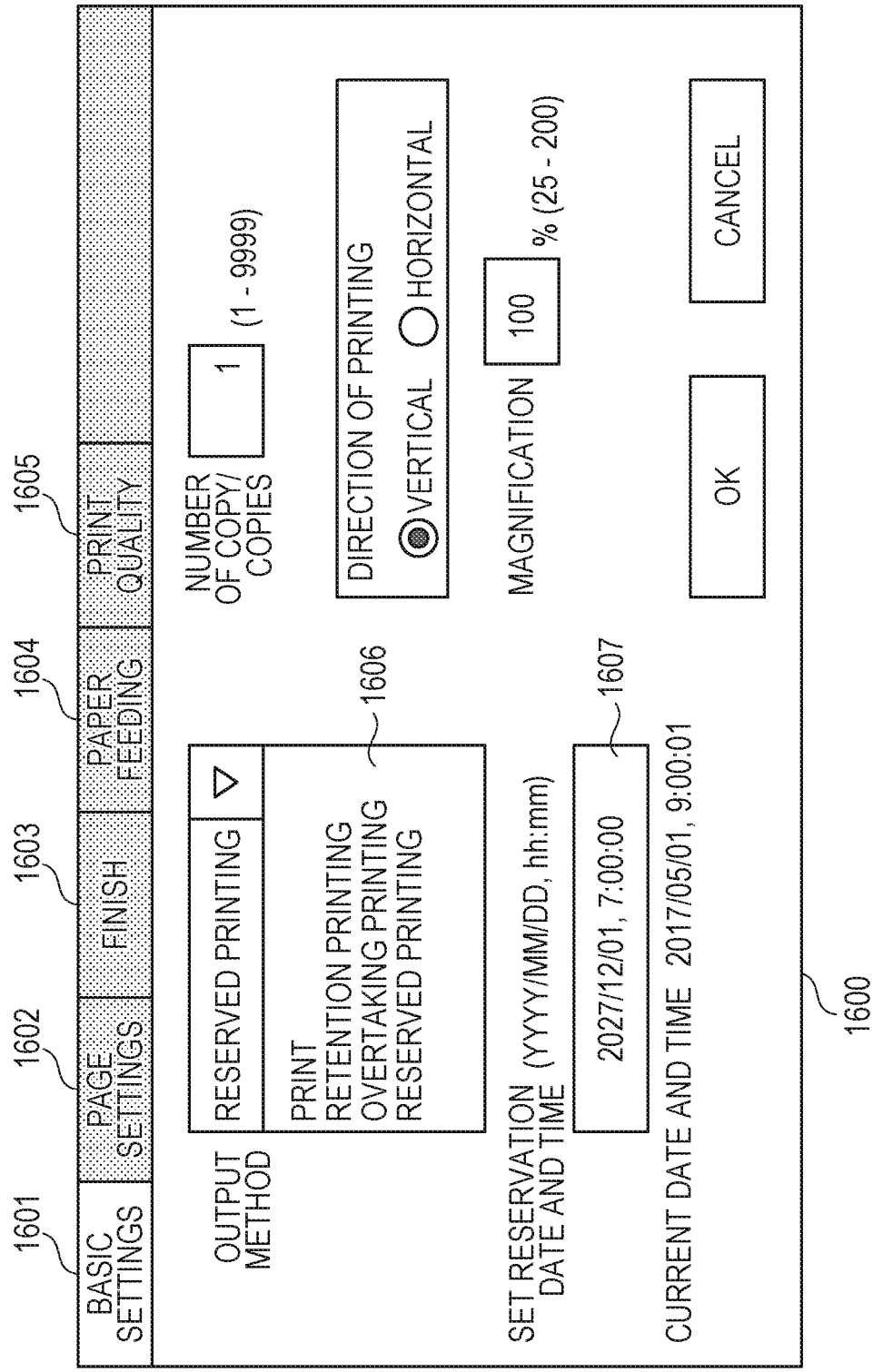
FIG. 16 illustrates a customized print driver screen.

FIG. 16 illustrates an example of a screen presented by a print driver installed in the PC 102 according to Embodiment 3 of the present disclosure.

FIG. 16 illustrates a printer driver screen 1600. The screen 1600 has a BASIC SETTINGS tab 1601, a PAGE SETTINGS tab 1602, a FINISH tab 1603, a PAPER FEEDING tab 1604, and a PRINT QUALITY tab 1605, any one of which is selected to display its corresponding setting screen.

The BASIC SETTINGS tab 1601 includes an output method menu 1606 displaying output methods including print, retention print, overtaking printing, reserved printing and preview, any one of which can be selected in a pull-down form. When reserved printing is selected in the output method menu 1606, a print job of a reserved printing can be generated. A reservation time designation area 1607 has a free form for setting a time for execution of printing of the reserved printing. By setting a year, month, day, hour and minute in YYYY/MM/DD, hh:mm:ss form in the reservation time designation area 1607, the printing can be executed at the designated date and time. The reservation time designation area 1607 is configured to receive input when a reserved printing is designated in the output method menu 1606.

The PAGE SETTING tab 1602 displays a menu for setting a page layout and a magnification of an output image. The FINISH tab 1603 displays a menu for selecting simplex or duplex printing, setting a binding direction, and setting a discharge method. The PAPER FEEDING tab 1604 displays a menu for selecting which paper feed stage of the MFP 101 for feeding paper to output. The PRINT QUALITY tab 1605 displays a menu for setting quality of an output image including a color mode (polychrome/monochrome) and a resolution.

Because details of Embodiment 3 excluding the processing sequence described with reference to FIG. 15 and the customized print driver screen described with reference to FIG. 16 overlap those of Embodiment 1, any repetitive descriptions will be omitted.

The aforementioned embodiments may prevent a print job of a reserved printing with a designated time setting in remote future from being retained in the HDD in the MFP. This can eliminate the possibility for exhausting the resource of the HDD in the MFP because of print jobs set as reserved printings.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-221221, filed Nov. 16, 2017, which is hereby incorporated by reference herein in its entirety.

What is claimed is:

1. An image forming apparatus configured to store a print job into a predetermined storage area, the image forming apparatus comprising:
   one or more processors; and
   at least one memory storing executable instructions, which when executed by the one or more processors, cause the image forming apparatus to:
   receive a print job;
   cancel the received print job without storing into the predetermined storage area in a case where the received print job is a reservation print job that includes a setting that designates print start time of the print job and, in addition, where waiting time before the reservation print job is to start is a predetermined time or longer; and
   store the received print job into the predetermined storage area in a case where the received print job is the reservation print job and, in addition, where the waiting time before the reservation print job is to start is shorter than the predetermined time.

2. The image forming apparatus according to claim 1, further comprising an operating unit,
   wherein the instructions, when executed by the one or more processors, further cause the image forming apparatus to:
   change an upper limit time regarding the reservation print job based on a user operation via the operating unit.

3. The image forming apparatus according to claim 2, wherein the upper limit time is changeable within a range between a settable lower limit and a settable upper limit.

4. The image forming apparatus according to claim 3, wherein the instructions, when executed by the one or more processors, further cause the image forming apparatus to:
   derive the waiting time of the reservation print job based on the setting and current time managed by the image forming apparatus; and
   determine whether or not the waiting time before the reservation print job is to start is the predetermined time or longer based on the derived waiting time and the upper limit.

5. The image forming apparatus according to claim 1, wherein the instructions, when executed by the one or more processors, further cause the image forming apparatus to:
   cancel the received print job without storing into the predetermined storage area in a case where print start time of the reservation print job identified based on the setting is determined to be earlier than the current time managed by the image forming apparatus.

6. The image forming apparatus according to claim 1, wherein the received print job stored as the reservation print job in the predetermined storage area is executed upon determining that a print start condition for the reservation print job is satisfied based on the setting and current time managed by the image forming apparatus.

7. The image forming apparatus according to claim 1, wherein the instructions, when executed by the one or more processors, further cause the image forming apparatus to:
   notify a user of predetermined information in a case where the received print job is canceled.

8. The image forming apparatus according to claim 1, wherein the instructions, when executed by the one or more processors, further cause the image forming apparatus to:
   notify a user of predetermined information in a case where the received print job stored as the reservation print job in the predetermined storage area is executed.

9. The image forming apparatus according to claim 1, wherein the instructions, when executed by the one or more processors, further cause the image forming apparatus to:
   delete the executed reserved print job from the predetermined storage area, in a case where the reserved print job is executed.

10. A control method for an image forming apparatus, the control method comprising:
    receiving a print job;

canceling the received print job without storing into the predetermined storage area in a case where the received print job is a reservation print job that includes a setting that designates print start time of the print job and, in addition, where waiting time before the reservation print job is to start is a predetermined time or longer; and storing the received print job into the predetermined storage area in a case where the received print job is the reservation print job and, in addition, where the waiting time before the reservation print job is to start is shorter than the predetermined time.

11. A non-transitory computer-readable storage medium storing a program comprising instructions, which when executed by one or more processors of an image forming apparatus, cause the image forming apparatus to:

receive a print job;

cancel the received print job without storing into the predetermined storage area in a case where the received print job is a reservation print job that includes a setting that designates print start time of the print job and, in addition, where waiting time before the reservation print job is to start is a predetermined time or longer; and store the received print job into the predetermined storage area in a case where the received print job is the reservation print job and, in addition, where the waiting time before the reservation print job is to start is shorter than the predetermined time.

* * * * *